United States Patent [19]

Itoh et al.

[11] 3,862,081

[45] Jan. 21, 1975

[54] SILICONE RUBBER COMPOSITIONS

[75] Inventors: Kunio Itoh; Naohiko Harada; Takeo Yoshida, all of Annaka, Japan

[73] Assignee: Shinetsu Chemical Company, Tokyo, Japan

[22] Filed: Oct. 23, 1973

[21] Appl. No.: 408,414

[30] Foreign Application Priority Data

Oct. 26, 1972 Japan.............................. 47-107554

[52] U.S. Cl. ........................ 260/37 SB, 260/46.5 G
[51] Int. Cl............................................. C08g 51/04
[58] Field of Search ................................. 260/37 SB

[56] References Cited
UNITED STATES PATENTS 3,498,945   3/1970   Lefort et al. .................... 260/37 SB
3,514,424   5/1970   Noble et al...................... 260/37 SB
3,711,520   1/1973   Pfeifer et al..................... 260/37 SB
3,776,885   12/1973  MacLeay..................... 260/37 SB X Primary Examiner—Lewis T. Jacobs
Attorney, Agent, or Firm—Toren, McGeady and Stanger

[57] ABSTRACT

Silicone rubber compositions comprising 100 parts by weight of an organopolysiloxane, 30 to 200 parts by weight of a silica filler, 3 to 200 p.p.m. by weight based on the organopolysiloxane of platinum or a platinum containing compound, an azo compound in an amount from 2 to 100 times as much as the platinum or platinum containing compound, and a curing agent. The compositions are heat cured to produce silicone elastomers having excellent self-extinguishability, mechanical strength and heat resistance.

8 Claims, No Drawings

SILICONE RUBBER COMPOSITIONS

FIELD OF THE INVENTION

The present invention relates to silicone rubber compositions having improved properties, particularly suitable for preparing silicone elastomers having excellent self-extinguishability.

DESCRIPTION OF THE PRIOR ART

Although silicone elastomers have been used in a wide variety of fields due to their excellent physical properties, they have the one disadvantage of inflammability. Therefore, various methods have been proposed to render silicone elastomers flame-retardant. For example, British Pat. No. 1,104,606 discloses a compound comprising an organopolysiloxane and a filler as well as a curing agent which is blended with a platinum containing material. Such a compound, containing a platinum material, is not capable of imparting to silicone elastomers produced therefrom satisfactory flame-retardant properties and also high degrees of heat resistance which is another important requirement. Furthermore, when an alkyl peroxide, such as, di-tert-butyl peroxide is used as the curing agent, it is more difficult to impart satisfactory flame-retardant properties to the resulting silicone elastomers than when an acyl peroxide is used instead.

The problem of improving flame retardancy has been studied with respect to the use of suitable flame-retardant materials in various plastic molding materials. The known flame-retardant materials are, for example, compounds of halogens and phosphorus and oxides of antimony. However, when these known flame-retardant additives are used in the preparation of silicone rubber compositions, they cause the silicone elastomers produced therefrom to have lower mechanical and electrical properties.

OBJECTS OF THE INVENTION

The object of the present invention is to provide silicone rubber compositions having excellent self-extinguishability.

Another object of the present invention is to provide self-extinguishable silicone rubber compositions having excellent mechanical and electrical properties.

Still another object of the present invention is to provide silicone rubber compositions having excellent heat resisting properties.

SUMMARY OF THE INVENTION

The silicone rubber composition of the invention comprises a. 100 parts by weight of an organopolysiloxane having the average unit formula $$R_a SiO_{4-a/2}$$

where R is a substituted or unsubstituted monovalent hydrocarbon radical and a is a number from 1.90 to 2.05, b. from 30 to 200 parts by weight of a silica filler in finely divided form, c. from 3 to 200 p.p.m. by weight based on the weight of ingredient (a) of platinum metal or a compound containing equivalent amount of platinum metal.

d. an azo compound having the general formula $$R'-N=N-R' \text{ or } R'-N=N-X-R'$$

where R' is a monovalent hydrocarbon radical and X is O or NH, in an amount from 2 to 100 times as much as the weight of ingredient (c), and e. a curing agent.

It has been discovered by the inventors that by heating and vulcanizing the compositions of the invention comprising ingredients (a) to (e) elastomers which have high degrees of heat resistance and mechanical strength similar to those of the conventional heat vulcanizing type silicone rubber can be obtained. It is another discovery of the inventors that when a strip of the rubber elastomer is suspended vertically and set on fire at its lower tip, it burns while kept in the fire flame, but it becomes self-extinguished at once when the flame has been removed.

The organopolysiloxane as ingredient (a) of the composition of the present invention is a primary ingredient for the conventional silicone rubber and is a linear polysiloxane having the average unit formula $$R_a SiO_{4-a/2}$$

where R is one or more organic monovalent hydrocarbon radicals selected from the group consisting of methyl, ethyl, propyl and phenyl radicals, their halogen derivatives, and vinyl and allyl radicals, in which the vinyl and phenyl radicals, if any, are not more than 2% and 30%, respectively, of the total organic radicals, and $a$ is a number from 1.90 to 2.05. For purposes of the invention, the linear polysiloxane having usually a viscosity of at least 100,00 cs, particularly, 1,000,000 cs at 25°C is preferred. The linear organopolysiloxane may contain a minor amount (or 10 mole percent or less) of $CH_3SiO_{1.5}$ units. The organopolysiloxane of the present invention may be a mixture of an organopolysiloxane containing a minor amount of $CH_2=CH(R)SiO$ units and an organopolysiloxane of comparatively low polymerization degree containing a large amount (or 5 to 100 mole percent) of the same units. When such a mixture is used, there can be obtained cured, molded articles having excellent mechanical strength and tear resistance. It may be added that the organopolysiloxane as ingredient (a) of the composition of the invention may have hydroxyl, trimethylsilyl or dimethylvinylsilyl radicals at the terminals thereof.

Ingredient (b) according to the present invention being a silica filler in finely divided form may be any of the conventional fillers useful for the reinforcement of silicone rubbers, such as, fume silica, precipitated silica, quartz powder, and, diatomaceous earth. It is preperred that the average particle size of these silica fillers is 50 μm (micrometer) or less in diameter. If ingredient (b) is used in too large an amount, the resulting silicone elastomers have poor physical properties. On the contrary, if the use of ingredient (b) is in too small an amount, the mechanical properties, e.g., the tensile strength of the resulting silicone elastomers will be poor. The most desirable amount of ingredient (b) is 30 to 200 parts by weight based on 100 parts by weight of ingredient (a).

That ingredient (c) of the silicone rubber composition of the invention being platinum or a platinum containing compound is an essential requirement for imparting self-extinguishable properties to the composition. Suitable examples of the platinum compounds are chloroplatinic acid and complexes formed from chloroplatinic acid with alcohols, ethers, aldehydes, olefins, etc. Ingredient (c) may be platinum in finely divided form supported on a carrier, such as, alumina, silica gel or asbestos. For purposes of the invention, it is used in amounts of from 3 to 200 p.p.m. by weight, preferably from 50 to 150 p.p.m. by weight, based on 100 parts by weight of ingredient (a) as platinum metal or as a compound containing platinum in the same amount.

Ingredient (d) being an azo compound of formula R'—N=N—R' or R'—N=N—X—R' is exemplified by $\alpha$, $\alpha'$-azobisisobutyronitrile, diazoaminobenzene, dicarboxylic acid diamide, azobenzene, 4-4'azophenol, 4-aminoazobenzene, esters of azodicarboxylic acid, such as, diethylazodicarboxylate, azocarbonamide, azoxybenzene, azoxybenzoic acid, or a mixture thereof. When the content of ingredient (d) in proportion to ingredient (c) is too small or too much, it will result to reduce the self-extinguishable effects of ingredient (d). It is therefore required to define the amount of ingredient (d) to be 2 to 100 times, preferably 10 to 70 times, as much as that of ingredient (c).

Ingredient (d) in co-operation with ingredient (c) imparts self-extinguishable properties to the cured, elastic organopolysiloxane. The inventors have further confirmed that the silicone rubber composition of the present invention, comprising jointly these ingredients, even when cured in the presence of an alkyl peroxide, such as, di-tert-butyl peroxide, results in the production of silicone rubber elastomers having excellent flame-retardant properties. This has made it possible to advantageously use di-tert-butyl peroxide as the curing agent. For example, good quality products can be obtained without the process of the so-called post-cure, since the decomposition residue of the di-tert-butyl peroxide used is volatile butanol. This is a remarkable advantage of the invention from the processing point of view.

Further, it is possible according to the invention that void-free silicone rubbers having a good flame-retardant property can be produced even by use of an azo compound or compounds which generate nitrogen gas when decomposed by heat. That is to say, ingredients (a) to (d) of the invention are mixed together and subjected to a preheating step, and the resulting mixture is kneaded in the presence of a curing agent, such as, 2,4-dichlorobenzoyl peroxide, so that curing is performed satisfactorily with heat in a hot air oven under atmospheric pressure.

Next, ingredient (e) being a curing agent or cross-linking agent, can be a known organic peroxide or organohydrogen polysiloxane. Examples of the organic peroxides are benzoyl peroxide, tert-butyl perbenzoate, 2,4-dichlorobenzoyl peroxide, di-tert-butyl peroxide, dicumyl peroxide and monochlorobenzoyl peroxide. An example of the organohydrogen polysiloxane is methylhydrogen polysiloxane having at least two Si—H bonds in a molecule. The organic peroxide is used in an amount equivalent to 0.5 to 5 parts by weight based on 100 parts by weight of ingredient (a). The organohydrogen polysiloxane is used in an amount such that the Si—H bond will be from 0.8 to 5.0 moles per mole of the Si—CH=CH$_2$ group contained in ingredient (a).

Into the silicone rubber compositions of the invention thus far described there may be incorporated low molecular organosilicon compounds, such as, diphenyl silane diol, diphenyl methyl silanol and alkoxy silanes, pigments and other additives, if desired.

The silicone rubber compositions thus formulated can be subjected to heating to about 100° to 350°C under normal or higher pressure for several seconds to 1 hour and thereafter to post-curing, if desired, to be converted to final products, for example, in the form of sheets, tube and wire coating, having excellent heat resistance, flame-retardancy and elasticity.

The present invention will be illustrated with reference to the following examples. In the examples, parts are expressed as parts by weight.

The self-extinguishability as used in the description of the examples was determined by the following manner.

A strip 0.5 cm wide and 20 cm long was cut from a sheet 2 mm thick, produced from the silicone rubber composition of the invention by heat-curing under pressure. This test piece was vertically suspended and the flame of an alcohol lamp was directly applied to its lower tip for 15 seconds for ignition, and then the alcohol lamp is removed. The time required for complete extinguishment of the ignited flame was measured, and it is denoted as the self-extinguishability in seconds.

EXAMPLES 1–6

100 parts by weight of organopolysiloxane gum (polymerization degree: 10,000) consisting of 99.8 mole percent of (CH$_3$)$_2$SiO unit and 0.2 mole percent of CH$_3$(CH$_2$=CH)SiO unit, 30 parts of Aerosil 200 (tradename for fume silica), and 3 parts of diphenyl silane diol as the silica dispersing agent were mixed together and kneaded by a two-roll kneader, and the resulting mixture was heated to 150°C for 1 hour. To 100 parts of the base compound thus obtained were added and kneaded by a two-roll kneader, powdery quartz (average particle size: 5 $\mu$m), manganese carbonate, titanium dioxide, 2% solution of chloroplatinic acid in isopropanol, azobisisobutyronitrile (ABN) and silicone oil paste containing 50% di-tert-butyl perbenzoate (DTBP) in amounts as individually indicated in Table I to follow. Each of the resulting mixtures was then pressed at 170°C under a pressure of 50 kg/cm$^2$ for 10 minutes, to produce a 2 mm thick sheet. From this sheet, test pieces were prepared and subjected to the self-extinguishability test. The results are shown in the table as "Self-extinguishability A". Separate from those test pieces, there were also prepared test pieces by the post-cure treatment at 200°C for 24 hours, and the resulting test pieces were subjected to the self-extinguishability test, the results being shown in the table as "Self-extinguishability B".

The test piece subjected to the self-extinguishability B test in Example 2 was found to have the following physical properties.

| Hardness (JIS C 2123) | 56 |
| Elongation, % | 260 |
| Tensile strength, kg/cm$^2$ | 65 |
| Tear resistance, kg/cm | 18 |
| Specific volume resistivity, ohm-cm | 3 × 10$^{15}$ |
| Dielectric breakdown voltage, kV/mm | 26 |

Table I

| Example No. | 1* | 2** | 3** | 4** | 5* | 6** |
| --- | --- | --- | --- | --- | --- | --- |
| Base compound (parts) | 100 | 100 | 100 | 100 | 100 | 100 |
| Powdery quartz (parts) | 50 | 50 | 50 | 70 | 50 | 50 |
| Manganese carbonate (parts) | nil | nil | nil | nil | nil | 15 |
| Titanium dioxide (parts) | 5 | 5 | 5 | — | 5 | — |
| Chloroplatinic acid sol tion (parts) | 0.1 | 0.1 | 0.1 | 0.1 | 0.1 | 0.1 |
| ABN (multiple proportion to platinum contained in the chloroplatinic acid) | nil | 20 | 50 | 50 | 200 | 50 |
| DTBP Paste (parts) | 1.0 | 1.0 | 1.0 | 1.0 | | |
| DTBP Paste (parts) | 1.0 | 1.0 | 1.0 | 1.0 | 1.0 | 1.0 |
| Self-extinguishability A (sec.) | More than 60 | 20 | 8 | 10 | More than 60 | 3 |

Table 1—Continued

| Example No. | 1* | 2** | 3** | 4** | 5* | 6** |
|---|---|---|---|---|---|---|
| Self-extinguishability B (sec.) | 50 | 15 | 5 | 5 | 50 | 3 |

*Comparative
**Present invention

EXAMPLES 7–9

100 parts of organopolysiloxane gum (polymerization degree: 10,000) consisting of 96.8 mole percent of $(CH_3)_2SiO$, 0.2 mole percent of $CH_3(CH_2=CH)SiO$ and 3.0 mole percent of $(C_6H_5)_2SiO$, 30 parts of fume silica and 3 parts of diphenyl silane diol were mixed together and kneaded by a two-roll kneader, and the resulting mixture was heated to 150°C for 1 hour. To 100 parts of the base compound thus obtained were added and kneaded, powdery quartz, titanium dioxide, chloroplatinic acid solution, ABN and DTBP paste, all being the same as those used in Examples 1–6, in amounts as indicated in Table II to follow. Thereupon, similar procedures to the preceding examples were carried out to prepare test pieces, which were then subjected to the self-extinguishability tests, the results being shown in Table II.

Table II

| Example No. | 7* | 8** | 9** |
|---|---|---|---|
| Base compound (parts) | 100 | 100 | 100 |
| Powdery quartz (parts) | 30 | 30 | 30 |
| Titanium dioxide (parts) | nil | nil | 5 |
| Chloroplatinic acid solution (parts) | 0.1 | 0.1 | 0.1 |
| ABN (multiple proportion to platinum contained in the chloroplatinic acid) | nil | 50 | 50 |
| DTBP paste (parts) | 1.0 | 1.0 | 1.0 |
| Self-extinguishability A (sec.) | More than 60 | 15 | 10 |
| Self-extinguishability B (sec.) | 40 | 10 | 7 |

*Comparative
**Present invention

EXAMPLE 10

100 parts of the base compound of Examples 1–6 were mixed with 50 parts of powdery quartz (particle size: 5 μm), 5 parts of titanium dioxide, 0.1 part of 2% solution of chloroplatinic acid in isopropanol, ABN in an amount 50 times as much as the weight of platinum contained in the chloroplatinic acid and 1.5 parts of methylhydrogen polysiloxane (KF-99 of Shinetsu Chemical Company). From the resulting mixture test pieces were prepared in the same manner as those of Examples 1–6, and put for the self-extinguishability tests. As the result, the self-extinguishability A and B were found to be 8 and 5 seconds, respectively.

EXAMPLE 11

Test pieces were prepared as in Example 10, except that 1 part of the DTBP paste of Examples 1–6 was used as a curing agent in addition to the methylhydrogen polysiloxane. The test pieces were subjected to the self-extinguishability tests. As the result, the self-extinguishability A and B were 8 and 6 seconds, respectively.

EXAMPLES 12–15

100 parts of methylvinyl phenyl silicone gum (polymerization degree: 8,000) consisting 94.8 mole percent of $(CH_3)_2SiO$ unit, 5 mole percent of $(C_6H_5)(CH_3)SiO$ unit and 0.2 mole percent of $(CH_3)(CH_2=CH)SiO$ unit were mixed with 50 parts of fume silica and 10 parts of hexamethyl disilazane. The resulting mixture was heated to 150°C for 2 hours. To 100 parts of the base compound thus obtained were added methylhydrogen polysiloxane, 2% solution of chloroplatinic acid in isopropanol, ABN and silicone oil paste containing 50% 2,4-dichlorobenzoyl peroxide in amounts as individually indicated in Table III to follow. Each of the resulting mixtures was pressed at 120°C under a pressure of 30 kg/cm² for 15 minutes to produce a 2 mm thick sheet. This sheet was then post-cured at 200°C for 2 hours, to obtain test pieces for the present examples. The test pieces were subjected to the self-extinguishability test, the results being shown in Table III.

All the test pieces used for the self-extinguishability test had transparent appearance. The test piece used in the self-extinguishability test in Example 13 had the under-mentioned physical properties.

| Hardness (JIS C 2123) | 52 |
|---|---|
| Elongation, % | 350 |
| Tensile strength, kg/cm² | 100 |

Table III

| Example No. | 12* | 13** | 14** | 15** |
|---|---|---|---|---|
| Base compound (parts) | 100 | 100 | 100 | 100 |
| Methylhydrogen polysiloxane (parts) | nil | nil | 1.2 | 1.2 |
| Chloroplatinic acid solution (parts) | 0.1 | 0.1 | 0.1 | 0.1 |
| ABN (multiple proportion to platinum contained in the chloroplatinic acid) | nil | 50 | 50 | 50 |
| Dichlorobenzoyl paste | 1.3 | 1.3 | nil | 1.3 |
| Self-extinguishability (sec.) | Total burning | 30 | 23 | 18 |

*Comparative
**Present Invention

EXAMPLES 16–20

100 parts of the base compound of Examples 1–6, 60 parts of powdery quartz (particle size: 5 μm), 0.1 part of 2% solution of chloroplatinic acid in isopropanol and 1.0 part of a silicone oil paste containing 50% di-tert-butyl perbenzoate were mixed with one of the various azo compounds in amounts as indicated in Table IV to follow. Each of the resulting mixtures was then pressed at 170°C under a pressure of 50 kg/cm² for 10 minutes, to produce a 2 mm thick sheet. From these sheets, test pieces were prepared and subjected to the self-extinguishability test. The results are shown in the table.

TABLE IV

| Example No. | 16* | 17** | 18** | 19** | 20** |
|---|---|---|---|---|---|
| Azo compound | Nil | ABN | Diazoamino-benzene | Diazoamino-benzene | Dicarboxylic acid diamide |
| Amount (multiple proportion to platinum contained in the chloroplatinic acid) | — | 100 | 50 | 25 | 30 |
| Self-extinguishability (sec.) | More than 60 | 5 | 14 | 17 | 28 |

*Comparative
**Present invention

What is claimed is:

1. A silicone rubber composition comprising (a) 100 parts by weight of an organopolysiloxane having the average unit formula $$R_aSiO_{4-a/2}$$

where R is one or more substituted or unsubstituted monovalent hydrocarbon radicals selected from the group consisting of methyl, vinyl and phenyl radicals and a is a positive number from 1.90 to 2.05, (b) from 30 to 200 parts by weight of a finely divided siliceous filler, (c) from 3 to 200 p.p.m. by weight based on 100 parts by weight of ingredient (a) of platinum or a compound containing platinum in an equivalent amount, (d) $\alpha, \alpha'$-azobisisobutyronitrile in an amount of from 2 to 100 times as much as the weight of ingredient (c), and (e) a curing agent.

2. The silicone rubber composition as claimed in claim 1 wherein R consists of not more than 2 mole percent of vinyl, not more than 30 mole percent of phenyl, and the rest of methyl radicals.

3. The silicone rubber composition as claimed in claim 1 wherein said siliceous filler is selected from the group consisting of fume silica, precipitated silica, powdery quartz, diatomaceous earth and mixtures thereof.

4. The silicone rubber composition as claimed in claim 1 wherein said curing agent is selected from the group consisting of organic peroxides, methyl hydrogen polysiloxane and mixtures thereof.

5. The silicone rubber composition as claimed in claim 1 wherein said ingredient (c) is used in an amount of from 50 to 150 p.p.m. by weight based on 100 parts by weight of said ingredient (a.

6. The silicone rubber composition as claimed in claim 1 wherein said indredient (d) is used in an amount of from 10 to 70 times as much as that of said ingredient (c).

7. The silicone rubber composition as claimed in claim 1 wherein at least one low molecular organosilicon compound selected from the group consisting of diphenyl silane diol, diphenyl methyl silanol and alkoxy silanes is added to said ingredients (a) to (e).

8. A silicone rubber composition comprising (a) 100 parts by weight of a substantially linear dimethylpolysiloxane gum having not more than 2 mole percent of Si—CH=CH$_2$ groups, (b) from 30 to 200 parts by weight of a finely divided siliceous filler, (c) from 50 to 150 p.p.m. by weight based on 100 parts by weight of ingredient (a) of platinum or a compound containing platinum in an equivalent amount, (d) from 10 to 70 times as much as the weight of ingredient (c) of $\alpha, \alpha'$-azobisisobutyronitrile, and (e) at least one organic peroxide.

* * * * *